United States Patent
Stockdill

[11] 3,773,380
[45] Nov. 20, 1973

[54] TRACK MOUNTED COVER FOR PICKUP TYPE TRUCK

[76] Inventor: Robert G. Stockdill, 7110 Green Valley Rd., Golden Valley, Minn.

[22] Filed: July 15, 1970

[21] Appl. No.: 55,196

[52] U.S. Cl. ............... 296/137 B, 296/16, 296/100
[51] Int. Cl. ........................... B60j 7/02, B60j 7/18
[58] Field of Search ...................... 296/10, 16, 100, 296/102, 137 R, 137 B, 137 E, 137 F, 137 G, 137 H, 35; 16/94, 96; 280/407

[56] References Cited
UNITED STATES PATENTS

| | | | |
|---|---|---|---|
| 3,228,721 | 1/1966 | Ehret | 296/16 |
| 3,329,462 | 7/1967 | Baur | 296/137 |
| 3,479,055 | 11/1969 | Cunha et al. | 280/407 |
| 2,524,633 | 10/1950 | Orjala | 296/35 |

FOREIGN PATENTS OR APPLICATIONS

| 260,433 | 11/1926 | Great Britain | 296/137 |
|---|---|---|---|

*Primary Examiner*—Benjamin Hersh
*Assistant Examiner*—Winston H. Douglas
*Attorney*—Williamson, Palmatier & Bains, George F. Williamson, H. Dale Palmatier and Herman H. Bains

[57] ABSTRACT

A pickup truck having an open top truck body is provided with a rigid metallic cover. A track structure slidably mounted the rigid cover on the truck body and includes a pair of inverted channel shaped upper tracks secured to the internal flanges of the side walls of the rigid cover. A pair of T-shaped lower tracks are secured to the upper flanges on the side walls of the truck body. Each upper track engages with a lower track to permit the rigid cover to slide rearwardly from a forward position and thereby permit unloading of the truck body adjacent the front end thereof.

1 Claim, 3 Drawing Figures

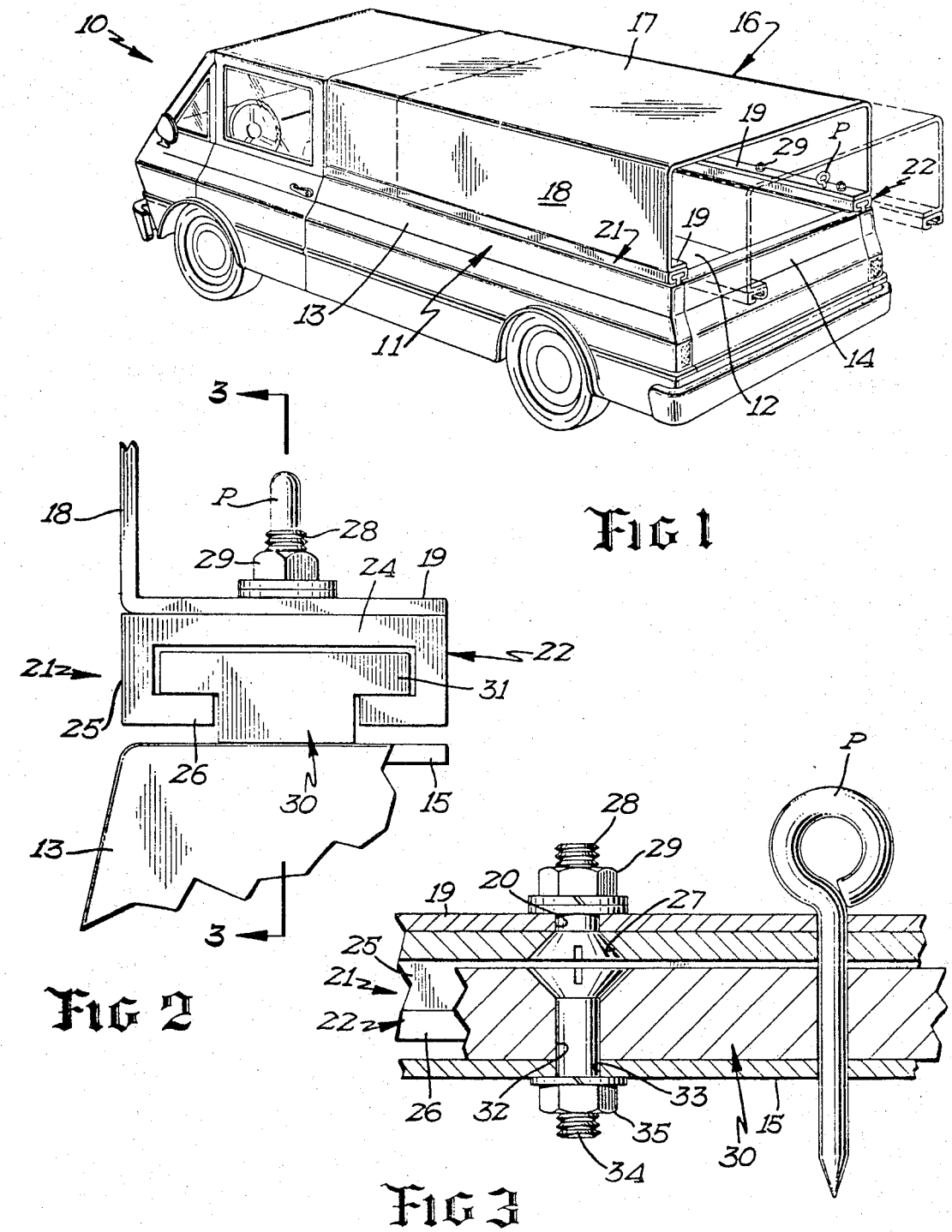

TRACK MOUNTED COVER FOR PICKUP TYPE TRUCK

SUMMARY OF THE INVENTION

An object of this invention is ys provyded provide a novel track structure for slidably mounting a rigid cover on the truck body of a pickup truck to permit the rigid cover to be shifted rearwardly from a forward position and thereby permit ready access to the front of the truck body. The novel track structure includes a channel shaped upper track and a T-shaped lower track which interengage each other and provide a simple and inexpensive means for slidably mounting the cover on the truck body. A releasable locking pin is provided for each upper and lower track to releasably lock the cover on the truck body when the cover is in the forward position.

These and other objects and advantages of this invention will more fully appear from the following description made in connection with the accompanying drawings wherein like reference characters refer to the same or similar parts throughout the several views.

BRIEF DESCRIPTION OF THE FIGURES OF THE DRAWINGS

FIG. 1 is a perspective view of a pickup truck having a rigid cover mounted on the truck body thereof and incorporating the novel track device;

FIG. 2 is an enlarged fragmentary cross-sectional view illustrating the details of construction of an upper track member and a lower track member; and FIG. 3 is a cross-sectional view of a fragmentary portion of a lower track member and an upper track member illustrating the manner in which these track members are respectively mounted on the truck body and rigid cover.

DETAILED DESCRIPTION OF THE INVENTION

Referring now to the drawings and more specifically to FIG. 1, it will be seen that a pickup truck designated generally by the reference numeral 10 is there shown. This pickup truck is of conventional construction and includes a truck body 11 having a bed or floor 12 and provided with upstanding side walls 13. A tail gate 14 permits the open rear end of the truck body to be readily opened and closed. The side walls 13 of the truck body are provided with upper horizontal walls or flanges 15 which project inwardly towards each other as best seen in FIG. 2.

The pickup truck body 11 is provided with a rigid camper type cover 16 preferably formed of a lightweight metallic material such as aluminum or the like. This rigid cover 16 includes a substantially flat horizontal top wall 17 having side walls 18 integrally formed therewith and projecting downwardly therefrom. The side walls 18 have inturned flanges 19 integrally formed therewith and projecting inwardly therefrom throughout the respective lengths of the side walls. These flanges 19 have apertures 20 therein, the purpose of which will be more fully described hereinbelow.

The rigid cover 16 is slidably mounted on the truck body 11 by a track structure 21 to permit longitudinal sliding movement of the rigid cover. The track structure 21 is comprised of a pair of upper tracks 22, each being secured to one of the inturned flanges 19. Each upper track 22 is comprised of a web portion 24 having side flanges 25 integrally formed therewith and depending therefrom. These side flanges 25 are disposed in parallel relation with respect to each other and each terminates downwardly in a terminal inturned flange 26. The terminal flanges 26 extend towards each other but are disposed in spaced apart relation as best seen in FIG. 2.

The web portion 24 of each upper track has a plurality of longitudinally spaced apart ooenings 27 therein each of which is disposed in registering relation with an opening or aperture 20 in the associated inturned flange 19 of the rigid cover 16. Each bolt 28 projects through the registering openings and is secured in place by a nut 29. It will be noted that the openings in the upper track permit counter-sinking of the heads of the bolts so that the lower surface of the web portion 24 of each upper track is of planar configuration.

The track structure 21 also includes a pair of elongate similar lower tracks 30 which are of T-shaped cross-sectional configuration. Each lower track includes a vertical portion 31a and a horizontal portion 31, which projects outwardly and transversely from the vertical portion. Each lower track has a plurality of longitudinal spaced apart openings 32 therein which are disposed in registering relation with respect to openings 33 in the flange 15 of the associated side wall 13. Bolts 34 extend through the openings and are secured in place by nuts 35. Thus the lower tracks 30 are mounted upon the upper walls or flanges 15 of the side walls. In this regard, it will be noted that the upper and lower tracks extend throughout the respective lengths of the side walls of the truck body and the side walls of the rigid cover.

It will be noted that each upper track slidably engages one of the lower tracks so that the upper surface of the horizontal transverse portion of each lower track engages the lower surface of the web portion of the associated upper track. The terminal inturned flanges of each upper track underlie the lower surface of the transverse portion of each lower track. With this arrangement, the rigid cover is mounted for fore and aft sliding movement relative to the truck body. One of the problems associated with the use of a camper-type rigid cover with a pickup truck body is the inability to unload the front end portion of the truck body. Typically, these covers are fixedly mounted on the truck body, and when it is desirable to remove material or articles at the front end of the truck body, it is often necessary to completely unload the truck body since access to the front end is difficult.

However, by using the unique manner in which the rigid metallic cover is slidably mounted on the truck body, the front end of the truck body may be readily unloaded by merely sliding the cover rearwardly. The cover may be slid rearwardly from a completely forward position to any desired position and may be completely removed therefrom. Thus access to any part of the truck body may be readily obtained by merely sliding the cover in a rearward direction.

Means are provided for releasably locking the cover on the truck body in a forward position and to this end, it will be noted that each upper and lower pair of tracks has apertures therethrough adjacent the rear ends thereof. These apertures are disposed in registering relation with similar apertures in the flange 15 of the associated side wall of the truck body and flange 15 of the associated side wall of the cover. When the rigid cover is in the forward position, the apertures in each upper and lower pair of tracks will be in registering relation with each other. A pin P projects through these registering apertures and releasably locks the tracks in the forward position. It will be noted that the pin P has a looped-shaped upper end to facilitate manipulation of the pin. It will also be noted that when the rigid cover is in its forward-most position, it is disposed in engaging relation with the vertical wall defined by the cab of the pickup truck. Since the rigid cover 16 is of lightweight construction, the cover may be handled by a single person, even when it is completely removed from the truck body.

It is preferred that the upper and lower tracks of the track structure be formed of a lightweight material such as aluminum since such track members do not require lubrication but provide very smooth planar surfaces.

From the foregoing description it will be seen that I have provided a pickup truck with a novel means of slidably mounting a camper type rigid cover on the truck body. Upper and lower lightweight metallic tracks are mounted on the rigid cover and truck body respectively to slidably mount the rigid cover for fore and aft sliding movement. Means are also provided for releasably locking the cover on the truck body.

Thus it will be seen that I have provided a pickup truck with a slidable track mounted camper type cover, which is not only of simple and inexpensive construction, but one which functions in a more efficient manner than any heretofore known comparable device.

What is claimed is:

1. In combination with a pickup truck having a cab and an open top truck body, the truck body having upstanding opposed longitudinal side walls and an open rear end, a rigid cover structure including a horizontal top wall and a pair of vertical side walls integral with and depending from said top wall, each of said side walls having an inturned flange integral with the lower edge thereof, a track device slidably mounting said rigid cover structure on said truck body, said track device comprising a pair of elongate channel-shaped upper track members, means securing each upper track member to the inturned flange of one of the side walls of the cover structure, each upper track member corresponding in length to the length of the associated side wall of the cover structure, each upper track member including a web portion having side flanges integral therewith and depending therefrom, a pair of inturned terminal flanges integral with said side flanges and projecting inwardly towards each other, said web portions of each upper track member having a width corresponding to the width of an inturned flange on said vertical side walls, a pair of elongate lower track members, means securing each lower track member upon the upper edge portions of one of the side walls of the truck body, said lower track members corresponding in length to the length of the side walls of the truck body, each lower track member being of T-shaped cross-sectional configuration including an upright portion and a horizontal transverse portion projecting outwardly from the upright portion, the internal flanges of each upper track uderlying the transverse portion of the associated lower track member, each upper track member slidably engaging a lower track member to permit fore and aft sliding movement of the rigid cover between a forward position and a completely disengaged position, said cover being disposed in engaging relation with the cab of the truck in the forward position, one of the inturned flanges on said side walls having an aperture therein disposed in registering relation with an aperture in one of said upper track members, an aperture in one of said lower track members disposed in registering relation with said last mentioned apertures in said upper track and inturned flange when said cover is in the forward position, and an elongate pin extending through said apertures in the inturned flange, upper track member and lower track member to interlock said upper track members against movement with respect to its associated lower track member when the rigid cover is in its forward position.

* * * * *